(12) United States Patent
Osterkil

(10) Patent No.: US 6,334,634 B1
(45) Date of Patent: Jan. 1, 2002

(54) PUSH-TO-CONNECT TUBING FITTING

(75) Inventor: Alan D. Osterkil, Fort Wayne, IN (US)

(73) Assignee: International Truck and Engine Corporation, Warrenville, IL (US)

( * ) Notice: Subject to any disclaimer, the term of this patent is extended or adjusted under 35 U.S.C. 154(b) by 0 days.

(21) Appl. No.: 09/597,426

(22) Filed: Jun. 20, 2000

(51) Int. Cl.$^7$ ............................................... F16L 21/06
(52) U.S. Cl. ...................................... 285/322; 285/323
(58) Field of Search ................................. 285/322, 323

(56) References Cited

U.S. PATENT DOCUMENTS

| | | |
|---|---|---|
| 3,653,689 A | 4/1972 | Sapey et al. |
| 3,743,326 A | 7/1973 | Courtot et al. |
| 3,963,267 A | 6/1976 | Legris |
| 3,971,577 A | 7/1976 | Schemith |
| 4,005,883 A | 2/1977 | Guest |
| 4,083,586 A | 4/1978 | Helm |
| 4,146,254 A | 3/1979 | Turner et al. |
| 4,178,023 A | 12/1979 | Guest |
| 4,188,051 A | 2/1980 | Burge |
| 4,220,359 A | 9/1980 | Evenson et al. |
| 4,229,025 A * | 10/1980 | Volgstadt et al. ............ 285/105 |
| 4,240,651 A * | 12/1980 | Mariaulle ..................... 285/39 |
| 4,302,036 A | 11/1981 | Burge |
| 4,508,369 A | 4/1985 | Mode |
| 4,606,783 A | 8/1986 | Guest |
| 4,610,468 A | 9/1986 | Wood |
| 4,638,636 A * | 1/1987 | Guest ............................. 285/38 |
| 4,645,246 A * | 2/1987 | Guest ........................... 285/323 |
| 4,685,706 A | 8/1987 | Kowal et al. |
| 4,712,811 A | 12/1987 | Wier |
| 4,712,813 A * | 12/1987 | Passerell et al. ............. 285/250 |
| 5,156,423 A | 10/1992 | Gifford |
| 5,174,611 A * | 12/1992 | Byrd et al. ..................... 285/45 |
| 5,429,394 A | 7/1995 | Olson |
| 5,443,289 A * | 8/1995 | Guest ............................ 285/39 |
| 5,468,027 A * | 11/1995 | Guest ........................... 285/319 |
| 5,474,336 A * | 12/1995 | Hoff et al. ................... 285/322 |
| 5,511,830 A * | 4/1996 | Olson et al. ................. 285/243 |
| 5,580,100 A | 12/1996 | Umezawa et al. |
| 5,584,513 A | 12/1996 | Sweeny et al. |
| 5,607,193 A * | 3/1997 | Guest ........................... 285/308 |
| 5,636,662 A | 6/1997 | Olson |
| 5,683,120 A | 11/1997 | Brock et al. |
| 5,722,696 A | 3/1998 | Taneya .................................. |

* cited by examiner

*Primary Examiner*—J. J. Swann
*Assistant Examiner*—L. Lum
(74) *Attorney, Agent, or Firm*—Jeffrey P. Calfa; Dennis Kelly Sullivan; Neil T. Powell

(57) ABSTRACT

A push-to-connect tubing fitting which has a body, a collett with tubing gripping teeth that engage the tubing, and sealing devices. The collett is disposed within a bore in the body of the fitting. The collett has tubing gripping teeth on its inner bore which mechanically engage the outer surface of the tubing. A first sealing device is positioned within an inner bore of the collett at a point closer to the tubing insertion opening of the collett than are the tubing gripping teeth. This first sealing device seals the tubing to the collett. A second sealing device is disposed between the collett and the body. This second sealing device seals the collett to the body of the fitting and effectively completes the seal between the tubing and the body.

19 Claims, 5 Drawing Sheets

PUSH-TO-CONNECT TUBING FITTING

BACKGROUND OF THE INVENTION

This invention relates to an improved-push-to connect tubing fitting for engaging nylon tubing or tubing of like material. More specifically, the improved push to connect tubing fitting seals the tubing connection prior to mechanical engagement of the tubing to the fitting Upon insertion in the fitting, the tubing engages a sealing means prior to engaging the tubing gripping devices of the collett.

PRIOR ART

The purpose of the prior art push-to-connect tubing fittings is to allow assembly and disassembly of tubing connections without tools and as rapidly as possible. The tubing has a soft exterior and is circular in cross section. An example of a prior art tubing fitting with tubing assembled within the fitting is shown in FIG. 5. The prior art fittings 10 had a body 11 with a bore 12 in it. A collett 13 was positioned within the bore 12 of the body 11 to mechanically engage the nylon tubing 20 upon its insertion. The collett 13 had a bore 15 extending along the same axis as the bore 12 of the body 11 and all the way through the collett 13. Tubing gripping devices 16 were present on the inner surface of the bore 15 in the collett 13, at the end of the bore opposite the tubing insertion opening. The diametrical distance between radially opposite tubing gripping devices 16 was slightly less than the diameter of the outer surface of the tubing 20. Thus when the tubing 20 was inserted into the fitting 10, the end of the collett 13 opposite the tubing insertion opening was elastically deformed radially outward and the tubing gripping devices 16 engaged the outer diameter of the nylon tubing 20.

The prior art tubing fitting 10 had further structure to more positively engage the tubing 20 to the fitting 10. Radially outward of the tubing gripping devices 16 the collet 13 had ramped surfaces 24 on its outer surface which sloped toward the axis of the bore 15 in the collett 13 in the direction from the end farther from the insertion opening to the end closest to the insertion opening. The body 11 of the fitting 10 defined ramped surfaces 25 adjacent its inner bore 12 which also sloped toward the axis of the bore 12 from their end furthest from the tubing insertion opening to their end closest to the tubing insertion opening. The collett 13 was positioned in the body 11 of the fitting 10 such that the ramped surfaces 24 on its outer surface were disposed adjacent to but radially inside and further from the tubing insertion opening than the ramped surfaces 25 defined by the inner surface of the body 11 of the fitting 10. Thus, after the nylon tubing 20 was inserted into the fitting 10 the gripping devices 16 of the collett 13 would engage the nylon tubing 20. If thereafter, a force was applied to the tubing 20 in the proper direction to remove the tubing 20 from the fitting 10, the tubing 20 and the collett 13 would be forced as a unit toward the tubing insertion end of the fitting 10. This brought the ramped surfaces 24 on the outer surface of the collett 13 into facial engagement with the ramped surfaces 25 on the inner surface of the body 11 of the fitting 10 and caused the end of the collett 13 opposite the tubing insertion opening to constrict radially inward. Under such circumstances the inward force of the tubing gripping devices 16 on the tubing 20 was increased and the strength of the mechanical engagement between the tubing 20 and the collett 13 was further increased. In many instances a rigid cylindrical sleeve 27 was fixedly attached to the body 11 of the fitting 10 concentrically within the bore 12 of the body 11. This sleeve 27 protruded into the bore 12 of the body 11 toward the outer end of the fitting 10. The outer diameter of the sleeve 27 was slightly smaller than the inner diameter of the nylon tubing 20. When the tubing 20 was inserted into the fitting 10, the end of the tubing 20 slid over and surrounded the free end of the sleeve 27. The sleeve 27 thus supported the inside of the tubing 20 and prevented the tubing 20 from collapsing inward as increased force was applied to the outside of the tubing 20 by the tubing gripping devices 16 of the collett 13.

The sealing device 44 of the prior art tubing fitting 10 was disposed farther from the tubing insertion opening than were the tubing gripping devices 16 of the collett 13. The prior art fitting 10 had the sealing device 44 positioned co-axially inside the bore 12 of the body 11 at a point farther from the tubing insertion opening than the tubing gripping devices 16 of the collett 13. Thus as the tubing 20 was inserted into the fitting 10, it would first engage the tubing gripping devices 16 of the collett 13, and then as it was inserted farther into the fitting 10 it would sandwich the sealing device 44 between the outer surface of the tubing 20 and the bore 12 of the body 11. This effectively sealed the tubing 20 to the fitting 44. The tubing gripping devices 16 of the collett 13 often marred the outer surface of the tubing 20 which was to seal against the sealing device 44. In addition, the tubing 20 was often inserted into the fitting 10 far enough to engage the tubing gripping devices 16 of the collett 13 but not far enough to engage the sealing device and the connection would leak.

SUMMARY OF INVENTION

As a result,—an object of the present invention is to provide a fitting which allows quick, easy assembly and disassembly of a tubing connection without the use of tools and to further ensure that the tubing cannot be mechanically engaged by the fitting without being sealed to the fitting. A second object of the invention is to provide a fitting which does not mar the portion of the outer surface of the tubing which engages the sealing device.

The fitting of the present invention is similar to the fittings of the prior art. The fitting of the present invention has a body with a bore in it. A collett is positioned within the bore of the body and has a bore through it approximately parallel to the bore of the body. The collett has tubing gripping devices on the inner surface of its bore. A sealing device is positioned co-axially inside the inner bore of the collett at a point closer to the tubing insertion opening than are the tubing gripping devices of the collett. Another sealing device is positioned between the outer surface of the collett and the inner surface of the bore in the fitting body. Thus, when the tubing is inserted into the fitting, it first engages the sealing device on the inside of the collett and after it is further inserted into the fitting mechanically engages the tubing gripping devices of the collett. This causes the tubing to be sealed to the collett before it is mechanically engaged to the fitting. The sealing device positioned between the collett and the body of the fitting seals the collett to the body of the fitting and thus completes the sealing of the tubing to the fitting The use of a sealing device between the collet and the body is an alternative to different structures which effectively complete the sealing of the tubing to the fitting but make it necessary to use tools to disassemble the tubing from the fitting.

It can thus be seen that above described device accomplishes both of the objects of the invention. The first object is accomplished because the tubing must be inserted into the fitting far enough to engage the sealing device inside the bore of the collett before it engages the tubing gripping devices of the collett. Thus it is not possible to insert the tubing into the fitting tar enough to mechanically engage the fitting without the tubing having first engaged the sealing device inside the collett. The second object is accomplished because the portion of the outer surface of the tubing which engages the sealing device inside the collett has not contacted the tubing gripping devices of the collett and thus has not been marred.

DRAWINGS

Other objects and advantages of the invention will become more apparent upon perusal of the detailed description thereof and upon inspection of the drawings in which:

FIG. 1 a is sectional view of a first embodiment of the tubing fitting of the invention with tubing assembled within the fitting.

DETAILS OF INVENTION

Figure 1:
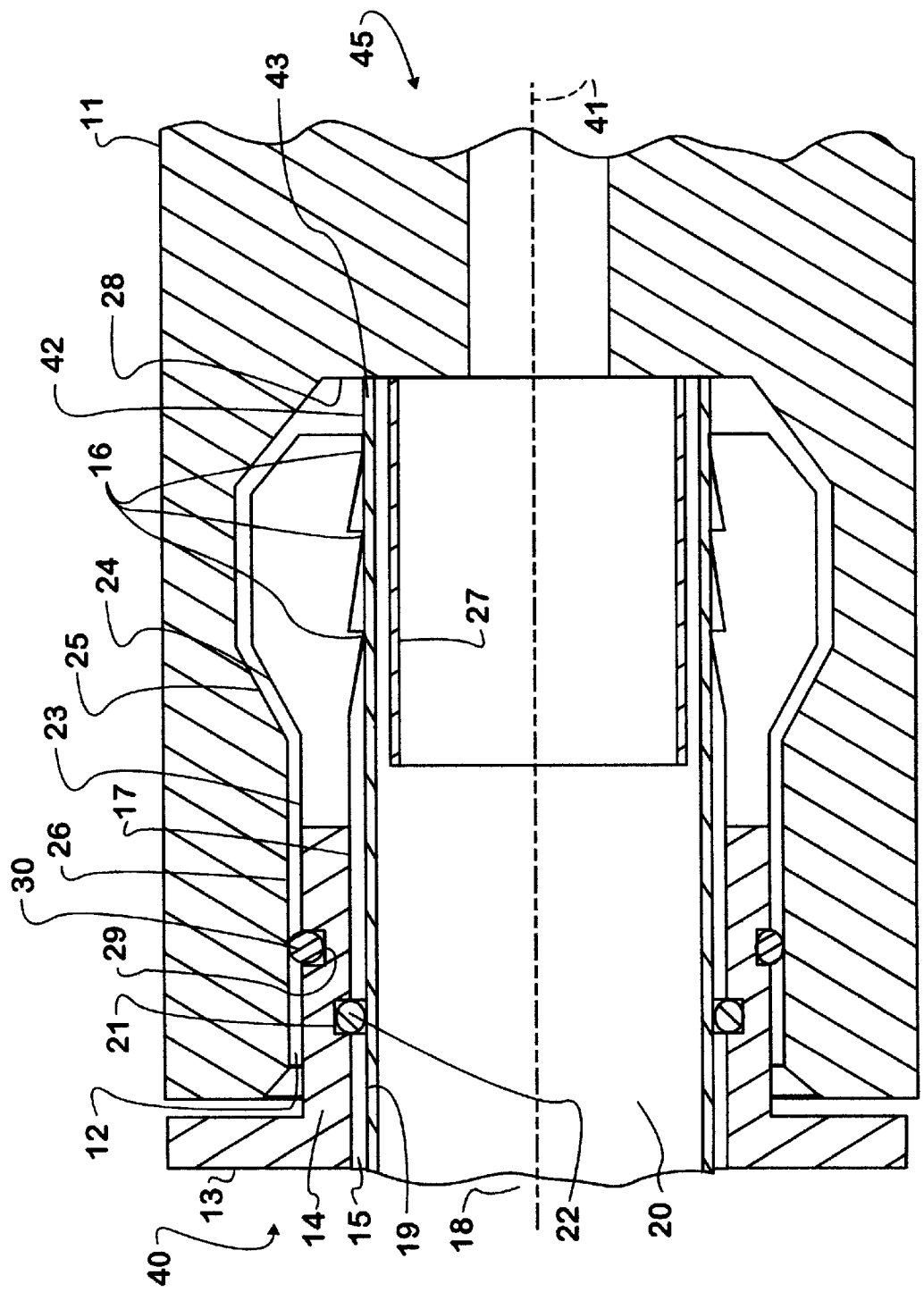
Figure 2:
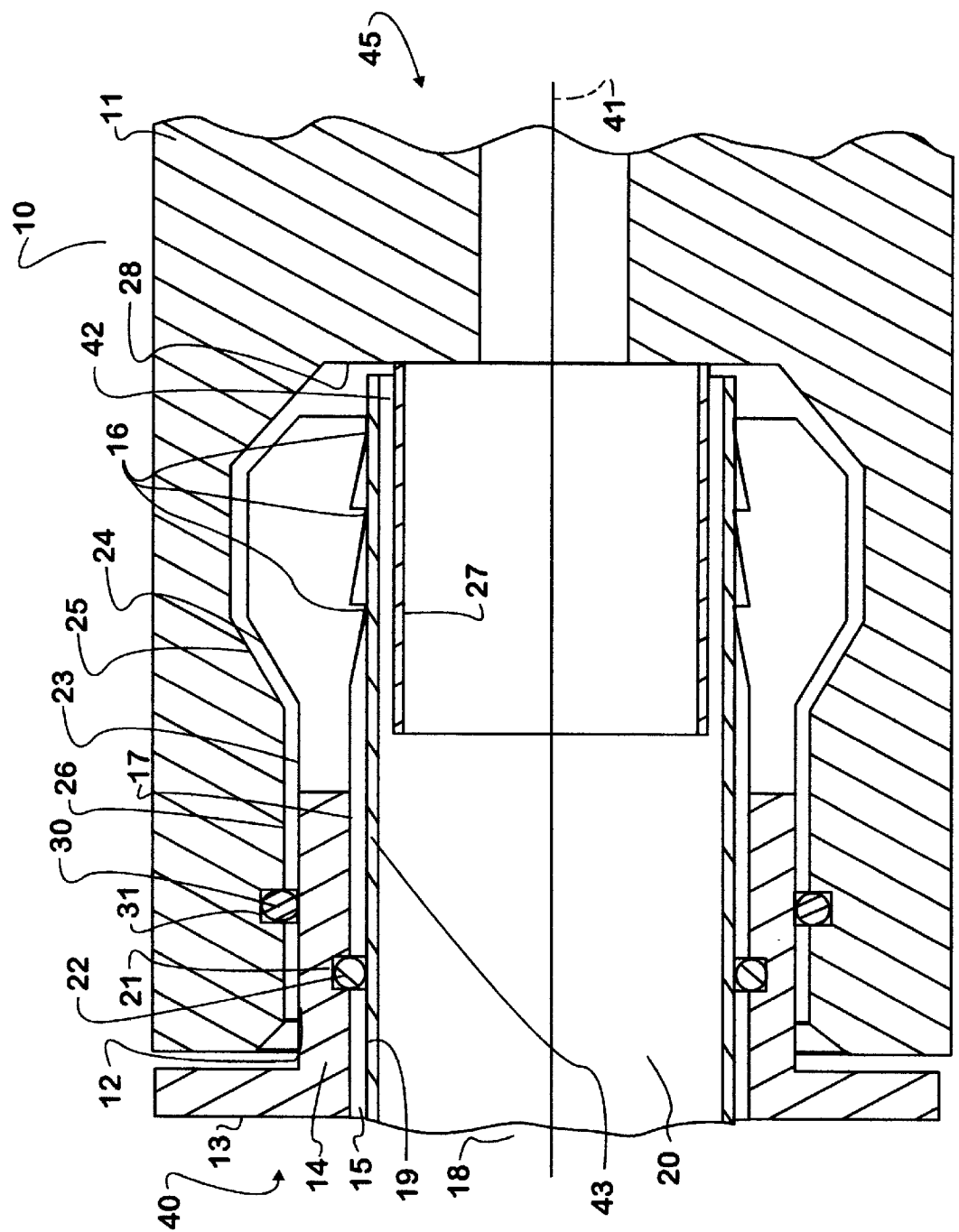
FIG. 2 is a sectional view of a second embodiment of the tubing fitting of the invention with tubing assembled within the fitting.
Figure 3:
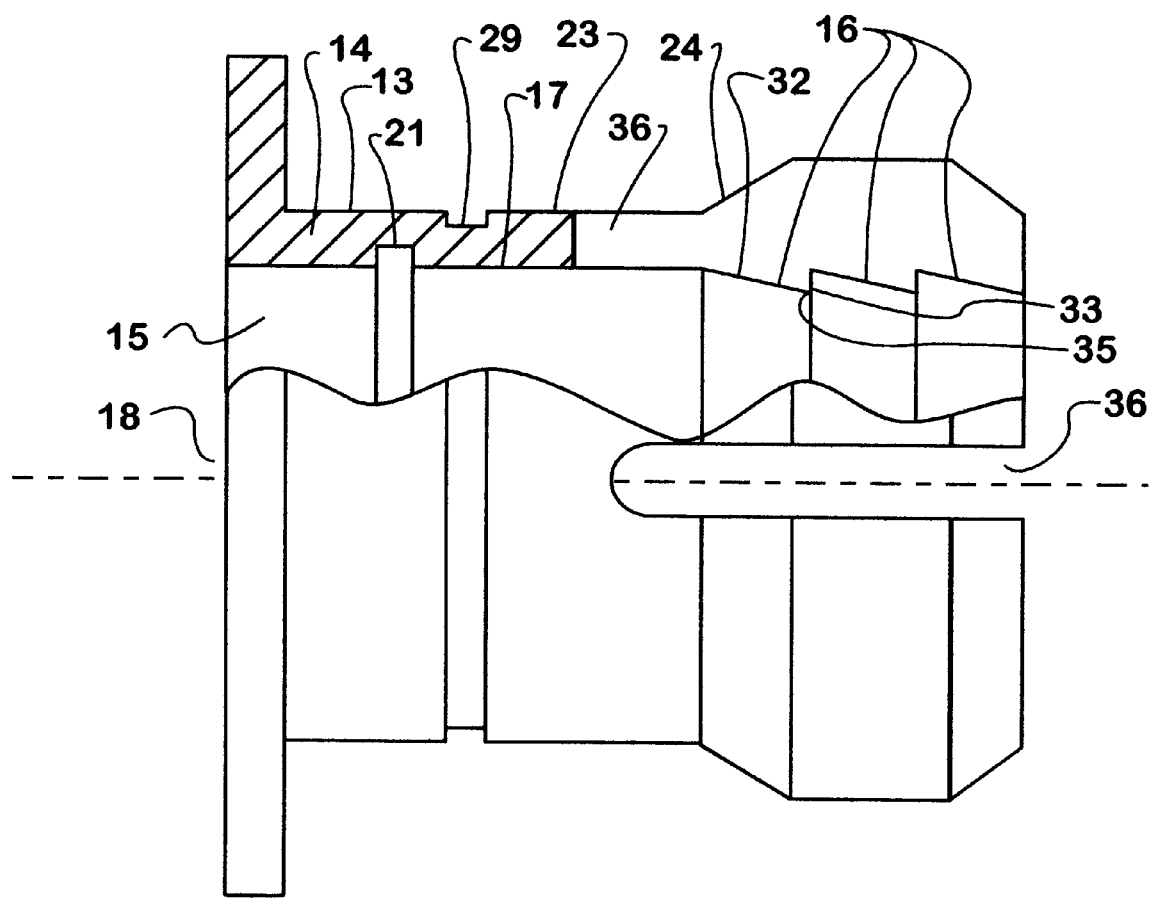
FIG. 3 is a partial sectional view of the collett of FIG. 1 along its axis.

There is shown in FIGS. 1 and 2 a push to connect tubing fitting in accordance with this invention. In the most basic form of the invention the fitting 10 has a body 11 which defines a bore 12 parallel to the axis 41 of the fitting 10. A collett 13 is disposed within the bore 12 of the body 11 of the fitting 10. The collett 13, has an outer wall 14, which defines a cylindrical bore 15 through the collett 13. Tubing gripping devices 16 are disposed on an inner surface 17 of the bore 15 of the collett 13. A sealing device 22 is positioned co-axially within the bore 15 of the collett 13, at a point closer to an outer end 40 of the fitting 10 than are the tubing gripping devices 16. Another sealing device 30 is positioned between an outer surface 23 of the collett 13 and an inner surface 26 of the bore 12 of the body 11. Thus when tubing 20 is inserted into the fitting 10 it first engages the sealing device 22 and after further insertion engages the tubing gripping devices 16.

The sealing device 22 may be held in position within the bore 15 of the collett 13 in numerous ways. The sealing device 22 may be held in place on the inner surface 17 of the bore 15 of the collett 13 with adhesive or various types of projections from or depressions into the inner surface 17 of the bore 15 of the collett 13. In the preferred embodiment the sealing device 22 is an O-ring and is positioned in a groove 21 on the inside surface 17 of the collett 13. Thus, as the tubing 20 is inserted through a tubing insertion opening 18 and into the bore 15 in the collett 13, it sandwiches the sealing device 22, between the outer surface 19 of the tubing 20, and the inside surface 17 of the collett 13. This effectively seals the tubing 20 to the collett 13.

Structure is included in the invention for sealing the collett 13 to the body 11 of the fitting 10. The sealing device 30 may be held in its between the outer surface 23 of the collett 13 and the inner surface 26 of the body 11 in numerous ways. The sealing device 30 may be held in place with adhesive or various types of projections from or depressions into either the outer surface 23 of the collett 13 or the inner surface 26 of the body 11. In the preferred embodiment, which is shown in FIG. 1, the collett 13 has an annular groove 29 in its outer surface 23. The sealing device 30 is positioned in the groove 29 and is sandwiched between the collett 13 and the body 11 of the fitting. In an alternative embodiment shown in FIG. 2 the annular groove 29 in the collett 13 is replaced by an annular groove 31 in the inner surface 26 of the body 11 of the fitting 10. In this alternative embodiment the sealing device 30 is sandwiched between the outer surface of the collett 23 and the annular groove 31 in the body 11.

To mechanically engage the tubing 20 the collett 13 has tubing gripping devices 16 on the inside surface 17 of its outer wall 14 which are positioned farther from the outer end 40 than is the sealing device 22. The tubing gripping devices 16 of the collett 13 may have many different forms, which would engage the tubing 20. The tubing gripping devices 16 could be any rough textured or knurled surface, teeth which project inwardly into the bore 15 of the collett 13, or any other structure which would mechanically engage the outer surface 19 of the tubing 20.

Figure 4:
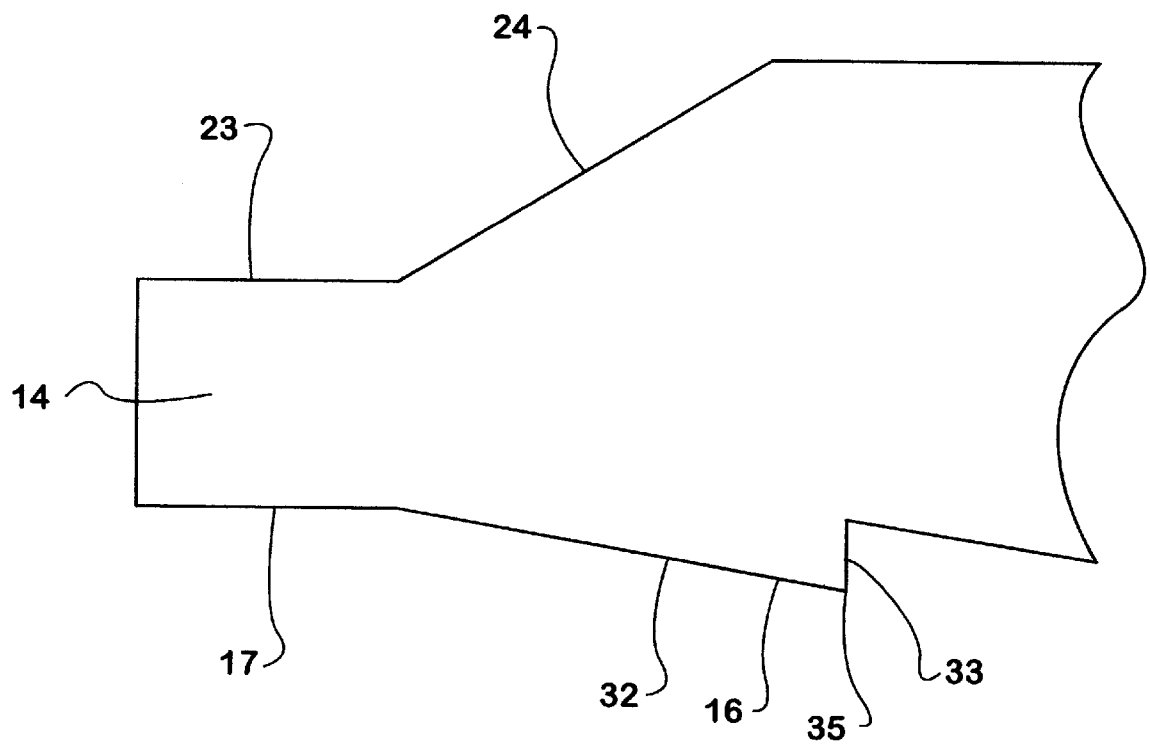
FIG. 4 is a sectional view of the portion of the collett of FIG. 1 or 2 adjacent the tubing gripping devices of the fitting.
Figure 5:
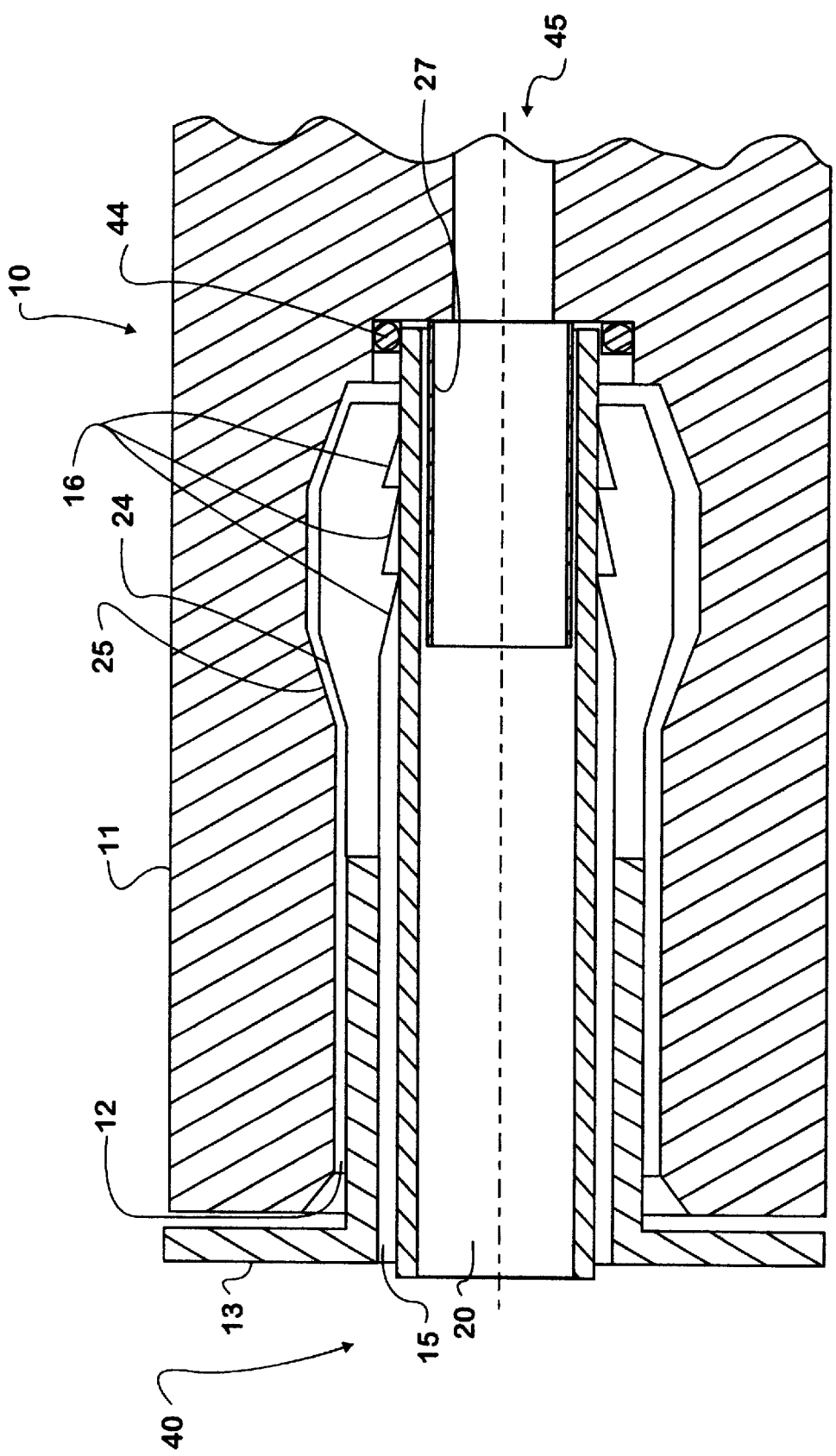
FIG. 5 is a sectional view of a prior art push-to-connect tubing fitting with tubing assembled within the fitting.

In the preferred embodiment shown in FIGS. 1, 2, 3 and 4 tubing gripping devices 16 are radially inwardly extending teeth as best shown in FIG. 4 The side of each tubing gripping device 16 which faces the outer end 40 is comprised of a sloped surface 32 which slopes away from the axis 41 of fitting 10 in the direction from farther from the outer end 40 to closer to the outer end 40. Because surface 32 slopes in this direction, as the tubing 20 is inserted into the collett 13 and the end 42 of the tubing 20 contacts surface 32, the portion of the collett 13 surrounding the tubing gripping devices 16 will be urged radially outwardly. This structure allows the tubing 20 to be inserted unimpeded beyond the tubing gripping devices 16 in the collett 13. The side of the tubing gripping devices 16, which faces away from the outer end 40, is comprised of surface 33. The intersection of surface 32 and surface 33 forms a sharp edge 35 which grips the outer surface of the tubing 20. The diametrical distance between radially opposite tubing gripping edges 35 may be slightly less than the diameter of the outer surface 19 of the tubing 20 to be used in the fitting 10. Thus as the tubing 20 is inserted into the fitting 10, past the sealing device 22 and further into the fitting 10 the tubing gripping edges 35 of the tubing gripping devices 16 would engage the outer surface 19 of tubing 20. After the tubing 20 and the collett 13 are mechanically engaged in this way any force applied to the tubing 20 in a direction tending to move the end 42 of the tubing 20 toward the outer end 40 will also force the collett 13 in the same direction. The collett 13, may have slots 36 in its outer wall 14 which are parallel to the axis of the bore 15 in the collett 13 and are positioned near the tubing gripping devices 16. These slots 36 would allow the wall of the collett 14 to more easily expand and contract radially.

In the preferred embodiment of the invention structure may be included in the fitting 10, to increase the strength of the engagement between the tubing 20 and the collett 13. In this embodiment collett 13 has ramped surfaces 24 depressed into and/or projecting out from its outer surface 23. These ramped surfaces 24 slope toward the axis of the fitting 41 in the direction from the end farthest from the outer end 40 to the end closest to the outer end 40. These ramped surfaces 24 are positioned, in the axial direction, near the tubing gripping devices 16 of the collett 13. The body 11 of the fitting 10 has corresponding ramped surfaces 25 depressed into and/or projecting out from the inner surface 26 of the body 10, These ramped surfaces 25 of the body 11 slope toward the axis 41 of the fitting in the direction from the end farthest from the outer end 40 to the end closest to the outer end 40. In the preferred embodiment when the collett 13 is correctly installed within the body 10 of the fitting 11, the ramped surfaces 24 of the collett 13 are positioned adjacent to, radially inward of, and farther from the outer end than are the ramped surfaces 25 of the body 11. Thus, after the tubing 20 is mechanically engaged the to the tubing gripping devices 16 of the collett 13, a force urging the tubing end 42 toward the outer end 40 will force the collett 13 in the same direction. This would cause the ramped surfaces of the collett 24 to facially engage the ramped surfaces 25 of the body 11. This causes the portion of the collett 13 near the ramped surfaces 24 to constrict radially and the tubing gripping devices 16 of the collett 13 apply more force to the outer surface 19 of the tubing 20 and more positively mechanically engage the tubing 20 within the fitting 10. The fitting 10 may also have a rigid cylindrical sleeve 27 fixedly attached to the body 11 of the fitting 10. The sleeve 27 protrudes from/past a surface 28 on the inside of the body 11 of the fitting 10. The sleeve 27 protrudes toward the outer end 40 at least far enough that a portion of the sleeve 27 is directly radially inward of the tubing gripping devices 16. Therefore, when the tubing 20 is installed in the fitting 10, the wall 43 of the end 42 of the tubing 20 is disposed between the sleeve 27 and the tubing engaging devices 16. The sleeve 27, would thus support the inside of the tubing 20, and prevents it from collapsing as the tubing gripping devices 16 of the collett 13 apply force radially inward to the outer surface 19 of the tubing 20.

In summary, the fitting 10 of the present invention allows for a tubing connection which can be quickly and easily assembled and disassembled without tools while not allowing a mechanical connection of the tubing to the fitting without the tubing being sealed within the fitting. The fitting 10 has a body 11 defining a bore 12 therein. The fitting 10 has a collett 13 which is positioned within the bore 12 of the body 11. As tubing 20 is inserted into the tubing insertion opening 18 it first engages a sealing device 22 and sandwiches the sealing device between the outer surface 19 of the tubing 20 and the inner surface 17 of the collett 13. Thus the tubing 20 is effectively sealed to the collett 13. As the tubing 20 is further inserted into the fitting 10 the tubing 20 engages surface 32 of tubing gripping device 16 and urges the collett 13 radially outward which allows the end 42 of tubing 20 to be inserted past the tubing gripping devices 16 of the collett 13. Because the collett 13 has been elastically deformed outward it urges the tubing gripping devices 16 on its inner surface 17 radially inward against the outer surface 19 of the tube 20. This force, applied to the outer surface 19 of the tubing 20 by the tubing gripping devices 16, creates an effective mechanical engagement between the tubing 20 and the collett 13 After the tubing 20 is assembled in the fitting 10, a force applied to the tubing 20 urging the end 42 of tubing 20 toward the outer end 40 will urge the collett in the same direction due to the mechanical engagement between the tubing and the collett. This causes the ramped surfaces 24 of the collett 13 to be brought into facial engagement with the ramped surfaces 25 of the body 11. This causes a portion of the collett 13 near the tubing gripping devices 16 to be constricted radially inwardly and the tubing gripping devices 16 exert even greater force on the surface 19 of the tube 20. A rigid sleeve 27 which is fixedly attached to the inside of the body 11 of the fitting 10 is disposed within the end 42 of the tubing 20 and prevents the force applied by the tubing gripping devices 16 of the collett 13 from collapsing the tubing 20. Thus, an even stronger mechanical connection is created between the tubing 20 and the fitting 10. The fitting 10 has a sealing device 30 sandwiched between the outer surface 23 of the collett 13 and the inner surface 26 of the body 11 effectively sealing the collett 13 to the body 11 and completing the seal between the tubing 20 and the fitting 10. In the same manner as prior art push-to-connect fittings the fitting 10 of the invention allows for easy removal of the tubing 20 from the fitting 10 without tools. The removal of the tubing 20 from the fitting 10 is accomplished by firsturging the collett 13 toward the inner end 45. Doing this ensures that the ramped surfaces 24 of the collett 13 do not facially engage the ramped surfaces 25 of the body 11 and the collett 13 is not constricted radially inward upon the tubing 20. While continuing to urge the collett 13 toward the inner end 45 the tubing is then urged in the opposite direction with sufficient force to overcome the mechanical engagement between the tubing 20 and the collett 13.

The design of the fitting 10 of the current invention accomplishes the object of making it impossible to mechanically engage the tubing 20 in the fitting 10 without being sealed to the fitting 10 which happened quite often with the prior art push-to-connect fittings. In addition the further object of providing a push-to-connect fitting which will not mar the portion of the outer surface 19 of the tubing 20 which engages the sealing device 22 has been met by the device described herein.

Those skilled in the art will appreciate that modifications could be made to the invention as described without departing from the spirit and scope of the invention and thus the scope of the invention is intended to be limited only by the following claims.

I claim:

1. A tubing fitting for creating a mechanical and fluid connection between tubing and other devices, comprising:

(a) a body which defines a bore therein;

(b) a collett with an outer wall defining a cylindrical bore through said collett;

(c) tubing gripping devices located on an inner surface of said outer wall of said collett;

(d) said collett being positioned within said bore of said body;

(e) a first sealing device disposed inside said bore of said collett for providing sealing engagement of an outer surface of the tubing to said inner surface of said bore in said collett;

(f) said first sealing device positioned in said collet closer to an outer end of said fitting than are said tubing gripping devices, whereby upon insertion into said fitting, the tubing would engage said sealing device before gripping said tubing engaging devices; and (g) a second sealing device disposed between said collett and said bore of said body for effectively sealing a gap between said collett and said body.

2. The tubing fitting of claim 1, wherein: (a) the diametrical distance between radially opposite portions of said tubing gripping devices is slightly less than the diameter of the outer surface of the tubing, such that, after the tubing is inserted into said collett past said tubing gripping devices, said tubing gripping devices mechanically engage the tubing, such that, as an end of the tubing, disposed in said fitting, is forced toward said outer end of said fitting said collett is also forced in the same direction by the tubing.

3. The tubing fitting of claim 2, wherein:

(a) said tubing gripping devices are radially inwardly extending teeth;

(b) an outer side of said radially inwardly extending teeth which faces said outer end is comprised of a sloped surface which slopes away from said axis of said bore in said collett in the direction from farther from said outer end to closer to said outer end, such that upon insertion of the tubing into said fitting, the end of the tubing contacts said outer side of said tubing gripping device and the tubing progresses unimpeded into said fitting and urges said tubing gripping device radially outward;

(c) said tubing gripping device is further comprised of an inner side which faces away from said outer end of said fitting; and (d) an intersection of said outer side of said tubing gripping device and said inner side of said tubing gripping device forms an edge for biting into the outer surface of the tubing.

4. The tubing fitting of claim 2, wherein:

(a) said body has first ramped surfaces depressed into or projecting out from an inner surface of said bore of said body;

(b) said first ramped surfaces of said body slope toward the axis of said bore of said body in the direction from farther from said outer end to closer to said outer end;

(c) said collett has second ramped surfaces depressed into and/or projecting out from said outer surface of said outer wall of said collett;

(d) said second ramped surfaces of said collett slope toward the axis of said bore through said collett in the direction from farther from said outer end to closer to said outer end;

(e) said second ramped surfaces of said collett are positioned near said tubing gripping devices in the direction of the axis of said bore through said collett; and (f) said collett is positioned in said body such that said second ramped surfaces of said collett are located adjacent to, radially inward from, and farther from said outer end of said fitting than are said first ramped surfaces of said body, such that, as said collett is forced toward said outer end, said second ramped surfaces of said collett facially engage said first ramped surfaces of said body, and the portion of said collett near said second ramped surfaces of said collett is constricted radially inward.

5. The tubing fitting of claim 4, wherein:

(a) said tubing gripping devices are radially inwardly extending teeth;

(b) an outer side of said radially inwardly extending teeth which faces said outer end is comprised of a sloped surface which slopes away from said axis of said bore in said collett in the direction from farther from said outer end to closer to said outer end, such that upon insertion of the tubing into said fitting, the end of the tubing contacts said outer side of said tubing gripping device and the tubing progresses unimpeded into said fitting and urges said tubing gripping device radially outward;

(c) said tubing gripping device is further comprised of an inner side which faces away from said outer end of said fitting; and (d) an intersection of said outer side of said tubing gripping device and said inner side of said tubing gripping device forms an edge for biting into the outer surface of the tubing.

6. The tubing fitting of claim 5, wherein:

(a) a first annular groove is present on said inner surface of said outer wall of said collett;

(b) said first sealing device is positioned within said first annular groove;

(c) a second annular groove is present in an outer surface of said outer wall of said collett; and (d) said second sealing device is positioned within said second annular groove.

7. The tubing fitting of claim 5, wherein (a) a first annular groove is present on said inner surface of said outer wall of said collett;

(b) said first sealing device is positioned within said first annular groove;

(c) a second annular groove is present in an inner surface of said bore of said body; and (d) said second sealing device is positioned within said second annular groove.

8. The tubing fitting of claim 4, wherein:

(a) a first annular groove is present on said inner surface of said outer wall of said collett;

(b) said first sealing device is positioned within said first annular groove;

(c) a second annular groove is present in an outer surface of said outer wall of said collett; and (d) said second sealing device is positioned within said second annular groove.

9. The tubing fitting of claim 4, wherein (a) a first annular groove is present on said inner surface of said outer wall of said collett;

(b) said first sealing device is positioned within said first annular groove;

(c) a second annular groove is present in an inner surface of said bore of said body; and (d) said second sealing device is positioned within said second annular groove.

10. The tubing fitting of claim 4, wherein:

(a) a rigid cylindrical sleeve is fixedly attached to said body;

(b) said rigid cylindrical sleeve has an outer diameter which is slightly smaller than an inner diameter of the tubing; and (c) said rigid cylindrical sleeve is disposed concentrically within said bore of said body and protrudes into said bore toward said outer end to at least the axial position of said tubing gripping devices of said collett so that when the tubing is correctly assembled within said fitting, a wall of the tubing is disposed between said rigid sleeve and said tubing gripping devices.

11. The tubing fitting of claim 10, wherein:

(a) said outer wall of said collett contains slots which are disposed longitudinally parallel to the axis of said bore in said collett; and (b) said slots are located near said second ramped surfaces of said collett to allow a portion of said collett near said ramped surfaces to expand and contract radially.

12. The tubing fitting of claim 11, wherein:

(a) said tubing gripping devices are radially inwardly extending teeth;

(b) an outer side of said radially inwardly extending teeth which faces said outer end is comprised of a sloped surface which slopes away from said axis of said bore in said collett in the direction from farther from said outer end to closer to said outer end, such that upon insertion of the tubing into said fitting, the end of the tubing contacts said outer side of said tubing gripping device and the tubing progresses unimpeded into said fitting and urges said tubing gripping device radially outward;

(c) said tubing gripping device is further comprised of an inner side which faces away from said outer end of said fitting; and (d) an intersection of said outer side of said tubing gripping device and said inner side of said tubing gripping device forms an edge for biting into the outer surface of the tubing.

13. The tubing fitting of claim 12, wherein:

(a) a first annular groove is present on said inner surface of said outer wall of said collett;

(b) said first sealing device is positioned within said first annular groove;

(c) a second annular groove is present n an outer surface of said outer wall of said collett; and (d) said second sealing device is positioned within said second annular groove.

14. The tubing fitting of claim 12, wherein (a) a first annular groove is present on said inner surface of said outer wall of said collett;

(b) said first sealing device is positioned within said first annular groove;

(c) a second annular groove is present in an inner surface of said bore of said body; and (d) said second sealing device is positioned within said second annular groove.

15. The tubing fitting of claim 12, wherein:

(a) Said first sealing device is an O-ring; and (b) Said second sealing device is an O-ring.

16. The tubing fitting of claim 15, wherein:

(a) a first annular groove is present on said inner surface of said outer wall of said collett;

(b) said first sealing device is positioned within said first annular groove;

(c) a second annular groove is present in an outer surface of said outer wall of said collett; and (d) said second sealing device is positioned within said second annular groove.

17. The tubing fitting of claim 15, wherein (a) a first annular groove is present on said inner surface of said outer wall of said collett;

(b) said first sealing device is positioned within said first annular groove;

(c) a second annular groove is present in an inner surface of said bore of said body; and (d) said second sealing device is positioned within said second annular groove.

18. The tubing fitting of claim 1, wherein:

(a) a first annular groove is present on said inner surface of said outer wall of said collett;

(b) said first sealing device is positioned within said first annular groove;

(c) a second annular groove is present in an outer surface of said outer wall of said collett; and (d) said second sealing device is positioned within said second annular groove.

19. The tubing fitting of claim 1, wherein (a) a first annular groove is present on said inner surface of said outer wall of said collett;

(b) said first sealing device is positioned within said first annular groove;

(c) a second annular groove is present in an inner surface of said bore of said body; and (d) said second sealing device is positioned within said second annular groove.

* * * * *